Oct. 8, 1957 W. F. ALBRECHT 2,809,279
LAMP BASING APPARATUS
Filed Nov. 24, 1954 2 Sheets-Sheet 1
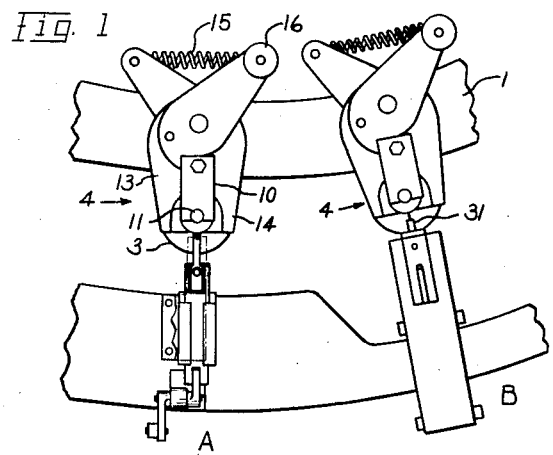
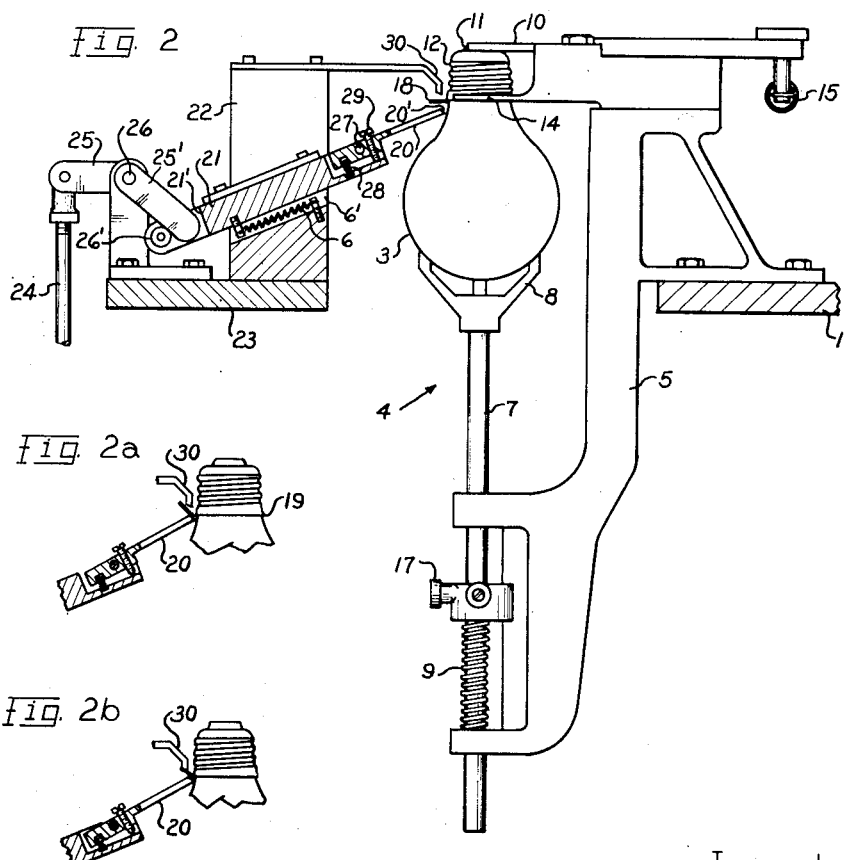
Inventor:
Warren F. Albrecht,
by Vernet C. Kauffman
His Attorney Oct. 8, 1957 W. F. ALBRECHT 2,809,279
LAMP BASING APPARATUS
Filed Nov. 24, 1954 2 Sheets-Sheet 2
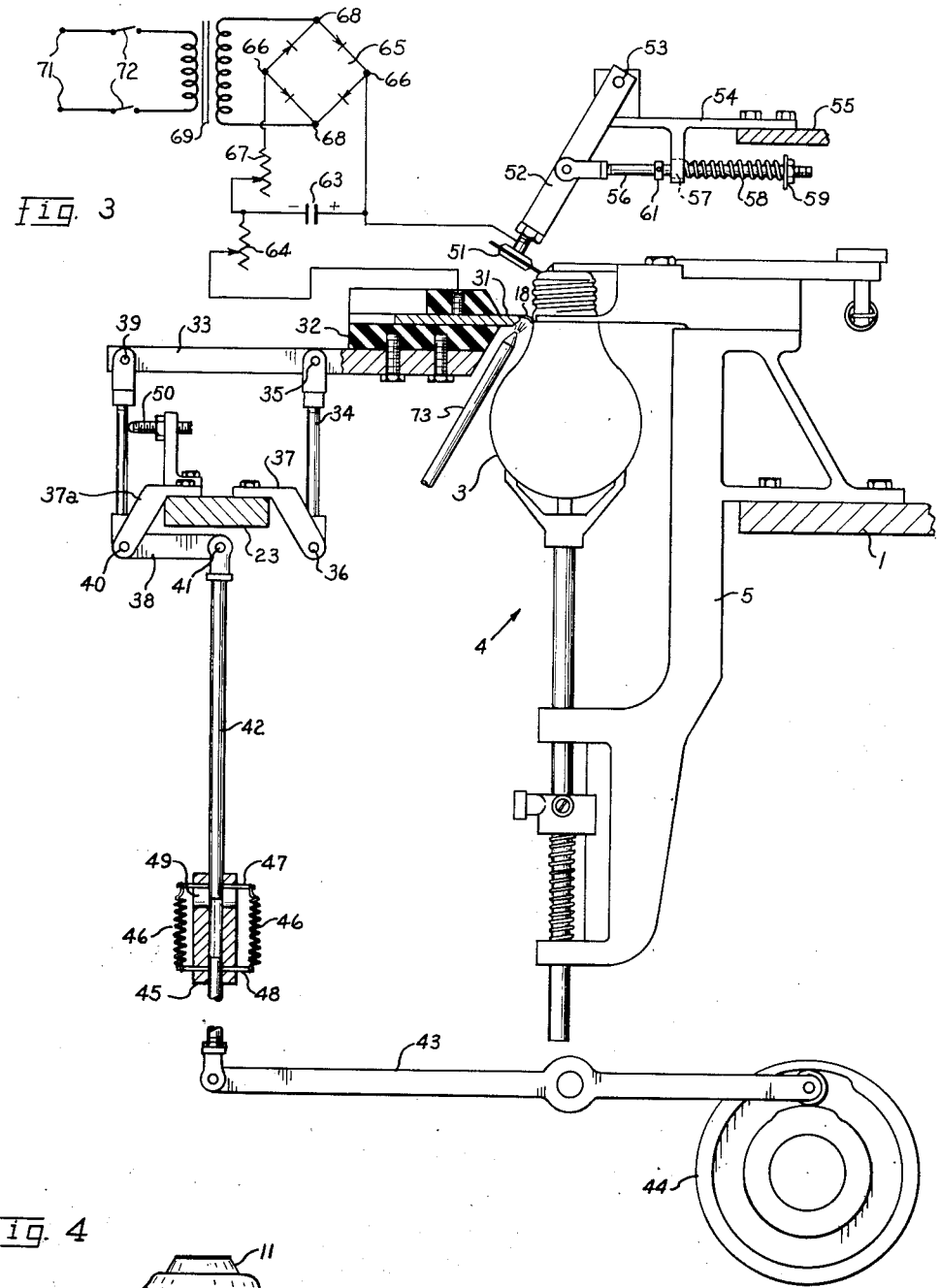
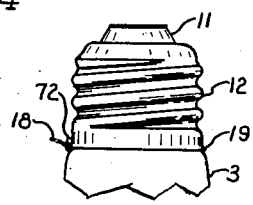
Inventor:
Warren F. Albrecht,
by Vernet C. Kauffman
His Attorney

United States Patent Office 2,809,279
Patented Oct. 8, 1957

2,809,279
LAMP BASING APPARATUS

Warren F. Albrecht, Euclid, Ohio, assignor to General Electric Company, a corporation of New York Application November 24, 1954, Serial No. 470,955

3 Claims. (Cl. 219—130)

This invention relates generally to the basing operation in the manufacture of electric lamps wherein a base is fastened to the neck portion of the glass bulb and permanent electrical connections are made between the lead wires and the metal parts of the base.

Until rather recently the bases of electric lamps were generally made of brass which was readily tinned and soldered. Due to the scarcity and high cost of brass, it has recently become desirable to use less expensive metals such as aluminum or steel for the bases of electric lamps, and these metals do not lend themselves well to soldering. A welded connection therefore becomes highly desirable. One method and apparatus for welding the side lead wire to the base is described and claimed in my co-pending application Serial No. 306,828, filed August 28, 1952.

In order to weld the side lead wire to the lamp base it is necessary that a good mechanical contact be made between the wire and the lip or edge of the base prior to welding. Failure to obtain this contact results in either no weld or a low weld in contact with the glass bulb.

Accordingly, it is an object of the present invention to provide a new and improved method and apparatus for assuring good mechanical contact between the lead wire and the base prior to the welding operation. It is a further object to provide a method and apparatus which will reshape the lead wire in a manner to assure formation of the weld at the outside of the lip of the base shell and farther away from the glass bulb. It is a further object to provide an arrangement of mechanisms whereby the contact between lead wire and base, once made, is not disturbed prior to the welding operation.

In accordance with the invention, presently employed mechanisms are retained to lift the side lead wire from a downwardly inclined position to a horizontal position, to then properly orient the wire angularly of the base and bulb, and to trim it to proper length. However, prior to the welding operation, a novel forming mechanism is employed to engage the portion of the wire contiguous to the lip of the base and wedge it tightly against and around the said lip. The wire, usually of copper, is flattened slightly and makes a good temporary contact with the base lip. Means are provided to hold the free end of the wire away from the base so that it curves outwardly and upwardly away therefrom at the proper angle for welding. The free end of the wire is then engaged by a welding electrode to cause it to be fused back into a globule welded to the side of the base shell.

Further objects and advantages of my invention will appear from the following description and from the drawing. The features of the invention believed to be novel will be more particularly pointed out in the appended claims.

In the drawings, Fig. 1 is a plan view showing a fragment of a lamp finishing or basing machine and wire forming and welding mechanisms operating in conjunction therewith;

Fig. 2 is an elevation of the lead wire forming mechanism at one station;

Figs. 2a and 2b are fragmentary elevations, partly in section, illustrating successive steps in the operation of the forming mechanism of Fig. 2;

Fig. 3 is an elevation of a welding mechanism at one of the stations, with the electrical components of the welding circuit diagrammatically illustrated; and Fig. 4 is a fragmentary elevation, on a larger scale, of the lamp bulb and base showing the finished welded connection and including a showing, in dotted lines, of the position of the side lead wire prior to welding.

The invention will be described by reference to a medium screw base of the type generally used for household incandescent lamps. It will be understood, however, that the invention is equally applicable to other lamps and to different sizes and types of bases, for instance to bayonet bases in which the side lead wire is connected to the straight walled cylindrical shell of the base.

Referring to Fig. 1, the forming and welding of the lead wire may be carried out through the use of the mechanisms located at stations A and B of a lamp finishing machine. The machine comprises a carrier or turret seen in part at 1, and suitable driving means (not shown) for intermittently rotating the turret in a counterclockwise direction. The glass bulbs 3 are held neck up in holders or heads 4 which are fastened to the turret around its periphery, and the intermittent rotation of the turret advances the bulbs to successive work stations at each index.

As seen in Fig. 2, each lamp holder or head 4 comprises a bracket 5 secured to the periphery of the turret 1. The bracket has a dependent portion supporting a vertical spindle 7 which carries at its upper end a crowfoot-shaped bulb cup 8. The spindle is urged upward by the spring 9 causing the bulb cup to press up resiliently against the end of the bulb 3. On the upper portion of the bracket there is provided a plate 10 which receives the end button or web 11 of the base 12, and a pair of pivotable holding jaws 13, 14 which are biased together by a tension spring 15. The lamp is held firmly in the holder and the base is pressed against the bulb neck by virtue of the upward pressure exerted on the bulb by the bulb cup. At the same time, the jaws 13, 14 pressing against the sides of the base 12 assist in seating it squarely on the neck of the bulb. The jaws 13, 14 may be pivoted open to release the base by locating a cam to engage the roller 16 affixed to the rearwardly projecting portion of jaw 13 at the stations of the machine where opening is desired. The lamp itself is released from the head 4 by a cam which engages roller 17 on spindle 7 and forces it down to relieve the pressure of the bulb cup on the lower end of the bulb.

In accordance with the illustrated embodiment, the lamp reaches station A with the side lead wire 18 extending horizontally and radially outward from between the neck of the bulb 3 and the contiguous lower edge or lip 19 (Fig. 4) of the base 12. The wire has been thus positioned by mechanisms at previous stations which lifted the wire from a downwardly inclined position to a horizontal position, then located the wire angularly in definite predetermined position, and finally trimmed it to proper length, for instance about ⅛ inch.

Referring to Fig. 2, the forming mechanism at station A comprises a finger 20 mounted on the forward end of a spring loaded slide 21 mounted for rectilinear movement in ways carried by a bracket 22 mounted on a stationary frame member 23 of the machine and normally urged forward by a spring 6 located in a well 6' in the slide ways. The slide 21 is normally restrained and retracted by a push rod 24 operating through a crank lever having arms 25, 25' pivoted at 26, the end of arm 25' being engaged by a roller 26' on slide 21. Rod 24 is actuated by a suitable cam (not shown) during a dwell period in the indexing motion of the turret. The slide is mounted at an angle of approximately 20° with the horizontal. The finger 20 is mounted on a pin 27 for pivotal movement in a vertical plane and has its forward end 20' tapered rearwardly from the bottom to the top at an angle of about 5°. The finger 20 is spring-loaded by virtue of a spring 28 held at its ends in wells in the finger and in the slide, and is maintained in a normal position by a stop screw 29.

Upon forward movement of the slide 21, the forward end 20' of the finger 20 is carried against the neck of the bulb 3 at a position below the rim of the base 12 and the lead wire 18. Upon continued motion of the slide 21, the finger 20 pivots about the pin 27 and slides upwardly along the bulb 3 into engagement with the wire 18 to push the wire firmly into engagement with the lower edge or lip 19 of the base. The copper wire 18 is flattened slightly and makes a good temporary contact with the base lip 19. The free end of the wire 18 is restrained from moving to a position against the base 12 by an anvil member 30 supported from the bracket 22 and extending to a position adjacent the base 12 and above the lower edge or lip 19 thereof. As illustrated in Fig. 2b, and in dotted lines in Fig. 4, the wire 18 is thus caused to curve outwardly and upwardly away from the edge of the base. The presence of sharp kinks or hooks is avoided in order to assure that the wire will not be burned off during the welding operation, but will be fused back upon the base 12.

By virtue of the spring loading of slide 21, a consistent pushing or wedging pressure is applied against the lip 19 of the base in spite of unavoidable small variations in the position of the lamp in the holder. In place of the spring 6, the spring loading may be arranged in the rod 24 in the manner described hereinafter in connection with the rod 42 shown in Fig. 3. In that case the arm 25' is urged against the surface 21' of the slide 21 for forward motion thereof.

After the forming operation at station A, the head 4 is indexed directly to station B where the welding operation is performed. The welding mechanism illustrated in Fig. 3 is like that disclosed and claimed in my aforesaid co-pending application Serial No. 306,828. The short projecting length or stub 18 of the lead wire, having been positioned and formed by the mechanism at station A, is contacted by the end of a comparatively massive electrode 31 which is supported within an insulating block 32 fastened on the forward end of a plate 33. The composition of the electrode 31 is not critical; it may be composed, for example, of carbon, silver, copper and copper alloys, or tungsten, copper being preferred. The plate 33 is supported at its forward end on a rod 34 which is hinged at 35 to the plate, and at 36 to a bracket 37 secured to the stationary frame member 23 of the machine. At its rear end, the plate is supported by a bell crank 38 which is hinged to it at 39, and hinged at 40 to bracket 37a secured to the member 23. The offset portion of the bell crank has fastened to it at 41 a connecting rod 42 which is reciprocated vertically through a rocker arm and cam arrangement 43, 44, the cam being driven in synchronism with the driving means of the turret so as to advance the plate 33 radially inward toward the bulb to enable the electrode 31 to contact the lead wire during the dwell interval of a bulb at the station. The connecting rod 42 is in two parts which are linked together through a sleeve 45 and a pair of tension springs 46 connected between transverse pins 47 and 48 in the upper and lower sections of rod 42, respectively. The upper pin 47 is free to ride in a slot 49 in the sleeve 45. This arrangement allows a lost motion through limits determined by pin 47 and its cooperating slot 49 and permits over-travel of the lower section of the pull rod after the electrode has contacted the lead wire 18. An adjustable stop bolt 50 limits the movement of the plate 33 toward the bulb 3.

To complete the welding circuit, the base shell is contacted at station B by a roller 51 which is rotatably fastened at the lower end of an inclined rod 52. Rod 52 is hinged at 53 on a bracket 54 fixed to a stationary frame member 55 of the machine. The roller 51 is pressed resiliently against the upper edge of the base shell by the inward pivoting of the arm 52 by means of a pull rod 56 having a shank passing through an oversize hole at 57 in a dependent portion of the bracket 54. The portion of the pull rod projecting to the rear of the bracket is provided with a spring 58 which is compressed between the bracket and a nut and washer 59. A stop ring 61 on the opposite side of the bracket from the spring limits the movement of the pull rod to prevent the roller 51 from swinging too far forward into the path of travel of the bulb holder.

The welding current has a drooping characteristic such as results from the exponential discharge of a condenser through a resistance. As illustrated schematically, a condenser 63 is arranged to be discharged through the lead wire 18, the connection being made directly from the positive side of the condenser to roller 51 which contacts the base shell, and from the negative side of the condenser, in series with an adjustable rheostat 64, to the electrode 31 which contacts the lead wire. The condenser 63 may have a value of approximately 2500 microfarads and the rheostat 64 may be adjustable between 0 and 10 ohms. For welding a side lead of 12 mil copper projecting a length of approximately 1/8 inch, the rheostat 64 may be set at approximately 8 ohms when the condenser 63 is charged to 200 volts at the beginning of the welding cycle. The condenser 63 may be recharged between the welding operations through any conventional system. For instance, as illustrated in the drawing, the recharging means may comprise a full wave bridge type rectifier 65 having one pair of conjugate points 66 connected in series with a control rheostat 67 across capacitor 63, and having the other pair of conjugate points 68 connected across the secondary winding of a step-up transformer 69. The primary winding of the transformer is energized from the usual 115 volt 60 cycle commercial supply at terminals 71 through a switch 72.

When the electrode 31 contacts the projecting length 18 of the lead wire, the condenser 63 begins to discharge immediately with a heavy current, for instance 20 amperes, through the lead wire. The wire is very rapidly heated to the fusion point and a small molten sphere thereupon forms on the end of the stub and enlarges as it withdraws away from the electrode toward the shell. Simultaneously an arc forms in the copper vapor between the end of the electrode and the molten sphere. The formation of the arc assures the concentration of heat on the end of the lead wire so that it continues to fuse and to draw back toward the shell of the base. As the molten sphere becomes united to the edge of the base shell over the lip 19, the condenser 63 is then sufficiently discharged that the arc extinguishes itself. The molten sphere on the end of the wire thereupon melts the adjacent metal of the shell of the base and becomes intermingled with it as shown at 72.

If desired, nozzle 73 may be employed to direct an air jet upwardly along the side of the bulb to blow away any vaporized metal of the lead wire 18 which might discolor or crack the bulb.

By virtue of the forming mechanism illustrated in Fig. 2, the lead wires are wedged securely and uniformly against the lip of the base in spite of unavoidable small variations in position of the lamp in its holder. Also, mechanical contact between the wire and the base established by the forming mechanism is not disturbed prior to welding. Furthermore, in contrast with methods and apparatus heretofore employed, actual mechanical contact takes place farther around to the outside of the lip of the base, thereby resulting in higher welds, i. e., farther away from the glass bulb.

What I claim as new and desire to secure by Letters Patent of the United States is:

1. In a lamp basing machine, the combination of an indexing carrier having thereon a holder means for a lamp bulb having a metallic base at its upper end with a lead-in wire extending laterally outward from between the bulb and the contiguous lower edge of the base, forming mechanism at a station occupied by said holder means and including pusher means for engaging the portion of said lead-in wire contiguous to said edge of the base and wedging it firmly against and around the said lower edge of the base in said holder means, and means for holding the free end of said wire away from the base to extend laterally and upwardly away therefrom, welding mechanism at a subsequent station including contact means engageable with said base and an electrode mounted for movement into abutting engagement with the free end of said lead-in wire, and a welding circuit connected across said contact and electrode and including means to establish an arc discharge from said electrode to said wire to cause the wire to be fused back to said base, and means for effecting operation of said mechanisms in proper timed relation to the indexing motions of said carrier.

2. The combination with holder means for a lamp bulb having a base on its upper end with a lead-in wire extending laterally outward from between the bulb and the contiguous lower edge of the base, of a wire reshaping mechanism comprising a finger member adjacent said holder means, means mounting said finger member for movement longitudinally toward said holder in an upwardly inclined direction to engage the bulb in said holder at a point under the said wire, said finger member being supported in said mounting means for pivotal movement upwardly whereby continued movement of said mounting means causes the finger to slide upwardly along the bulb to engage the said wire and wedge it against and around the lower edge of the said base, and a stationary anvil member mounted to be located adjacent said holder in a position adjacent to said base and above the lower edge thereof to restrain the free end of said wire and cause it to be arched around the end of said finger to extend laterally and upwardly away from the base.

3. The combination with holder means for a lamp bulb having a base on its upper end with a lead-in wire extending laterally outward from between the bulb and the contiguous lower edge of the base, of a wire reshaping mechanism comprising a support, a slide member mounted in said support for rectilinear movement in an upwardly inclined direction toward said holder means, a finger member projecting forwardly from the forward end of said slide member and mounted thereon for pivotal movement upward, said slide being arranged relative to said holder means to carry the forward end of the finger against the bulb therein at a point below the said lower edge of the base and under the wire extending therefrom, means for moving said slide forwardly a distance sufficient to cause the forward edge of said finger to first engage the said bulb and then slide upwardly therealong to engage the said wire and wedge it against and around the lower edge of the base, and a stationary anvil member mounted to be located adjacent said holder in a position adjacent to said base and above the lower edge thereof to restrain the free end of said wire and cause it to be arched around the end of said finger to extend laterally and upwardly away from the base.

References Cited in the file of this patent
UNITED STATES PATENTS
2,708,702    Albrecht _____ May 17, 1955